(12) United States Patent
Wang et al.

(10) Patent No.: US 10,885,265 B2
(45) Date of Patent: Jan. 5, 2021

(54) INFORMATION DISPLAYED WHILE INFORMATION IS SCROLLED ON A TERMINAL SCREEN

(71) Applicant: Alibaba Group Holding Limited, George Town (KY)

(72) Inventors: Haixin Wang, Hangzhou (CN); Xingan Jin, Hangzhou (CN); Zhijun Yuan, Hangzhou (CN); Wenhan Bian, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 15/816,869

(22) Filed: Nov. 17, 2017

(65) Prior Publication Data
US 2018/0150438 A1 May 31, 2018

(30) Foreign Application Priority Data

Nov. 21, 2016 (CN) .......................... 2016 1 1020961

(51) Int. Cl.
*G06F 3/048* (2013.01)
*G06F 40/109* (2020.01)
*G06F 40/279* (2020.01)
*G06F 3/0485* (2013.01)

(52) U.S. Cl.
CPC .......... *G06F 40/109* (2020.01); *G06F 3/0485* (2013.01); *G06F 40/279* (2020.01)

(58) Field of Classification Search
None
See application file for complete search history.

(56) References Cited

U.S. PATENT DOCUMENTS

| 5,913,215 | A | 6/1999 | Rubinstein |
| 6,055,542 | A | 4/2000 | Nielsen |
| 6,457,004 | B1 | 9/2002 | Nishioka |
| 7,793,230 | B2 | 9/2010 | Burns |
| 8,904,285 | B2 | 12/2014 | Watanabe |
| 9,082,350 | B2 | 7/2015 | Shinohara |
| 2004/0080532 | A1* | 4/2004 | Cragun ............. G06F 17/30716 715/745 |
| 2004/0153972 | A1 | 8/2004 | Jaepel |
| 2004/0260687 | A1 | 12/2004 | Mano |
| 2008/0052742 | A1 | 2/2008 | Kopf |
| 2008/0141126 | A1 | 6/2008 | Johnson |

(Continued)

FOREIGN PATENT DOCUMENTS

| JP | 2006163603 | 6/2006 |
| JP | 2013077239 | 4/2013 |
| JP | 2015026345 | 2/2015 |

*Primary Examiner* — William C Trapanese
(74) *Attorney, Agent, or Firm* — Van Pelt, Yi & James LLP

(57) ABSTRACT

Embodiments of the present application relate to a method, device, and system for displaying information. The method includes determining that an information list is being browsed, wherein the information list comprises a plurality of items, and an item in the plurality of items comprises one or more key words and one or more non-key words, receiving a slide instruction, in response to receiving the slide instruction, performing a slide function on at least a portion of the information list and performing one or more preset functions in relation to one or more words of the information list to display the one or more words of the information list differently from one or more other words in the information list.

26 Claims, 8 Drawing Sheets

(56) References Cited

U.S. PATENT DOCUMENTS

| | | |
|---|---|---|
| 2012/0060121 A1 | 3/2012 | Goldberg |
| 2012/0245922 A1* | 9/2012 | Kozlova ............... G06F 17/289 |
| | | 704/3 |
| 2012/0254745 A1 | 10/2012 | Sangiovanni |
| 2013/0024511 A1 | 1/2013 | Dunn |
| 2014/0282143 A1 | 9/2014 | Matas |
| 2016/0092428 A1 | 3/2016 | Ilic et al. |
| 2016/0125027 A1* | 5/2016 | Ohara ................. G06F 16/3341 |
| | | 707/767 |
| 2016/0139743 A1 | 5/2016 | Pan |

* cited by examiner

INFORMATION DISPLAYED WHILE INFORMATION IS SCROLLED ON A TERMINAL SCREEN

CROSS REFERENCE TO OTHER APPLICATIONS

This application claims priority to People's Republic of China Patent Application No. 201611020961.4 entitled METHOD AND MEANS OF DISPLAYING INFORMATION, filed Nov. 21, 2016, which is incorporated herein by reference for all purposes.

FIELD OF THE INVENTION

The present invention relates to information processing technology. In particular, the present invention relates to a method, system, and means of displaying information.

BACKGROUND OF THE INVENTION

Smart terminals such as mobile phones are becoming increasingly widespread. Users can use smart terminals to perform various operations. For example, users can use news applications installed on smart terminals to browse news and other information.

News applications generally display multiple news items displayed sequentially in a list. For example, when users open the news applications, users generally see multiple news items displayed sequentially in the form of a top-to-bottom list. The content of each displayed news item can include a headline, a small body of text, a news photo, etc. By swiping up or down via a touchscreen of the smart terminal, users can engage in preliminary browsing of each news item in sequence in order to find the news of interest. A user can view detailed information or contents on a particular news item by clicking on the news item or some other corresponding button or link.

Browsing news items or lists according to the current applications is often cumbersome and inefficient. For example, since there can be a large amount of news items displayed sequentially, users may need to scroll through many items and may have difficulty quickly finding news of interest. An effective solution is needed to address the navigation or finding of news items of interest or for finding information within lists.

BRIEF DESCRIPTION OF THE DRAWINGS

Various embodiments of the invention are disclosed in the following detailed description and the accompanying drawings.

DETAILED DESCRIPTION

Figure 1:
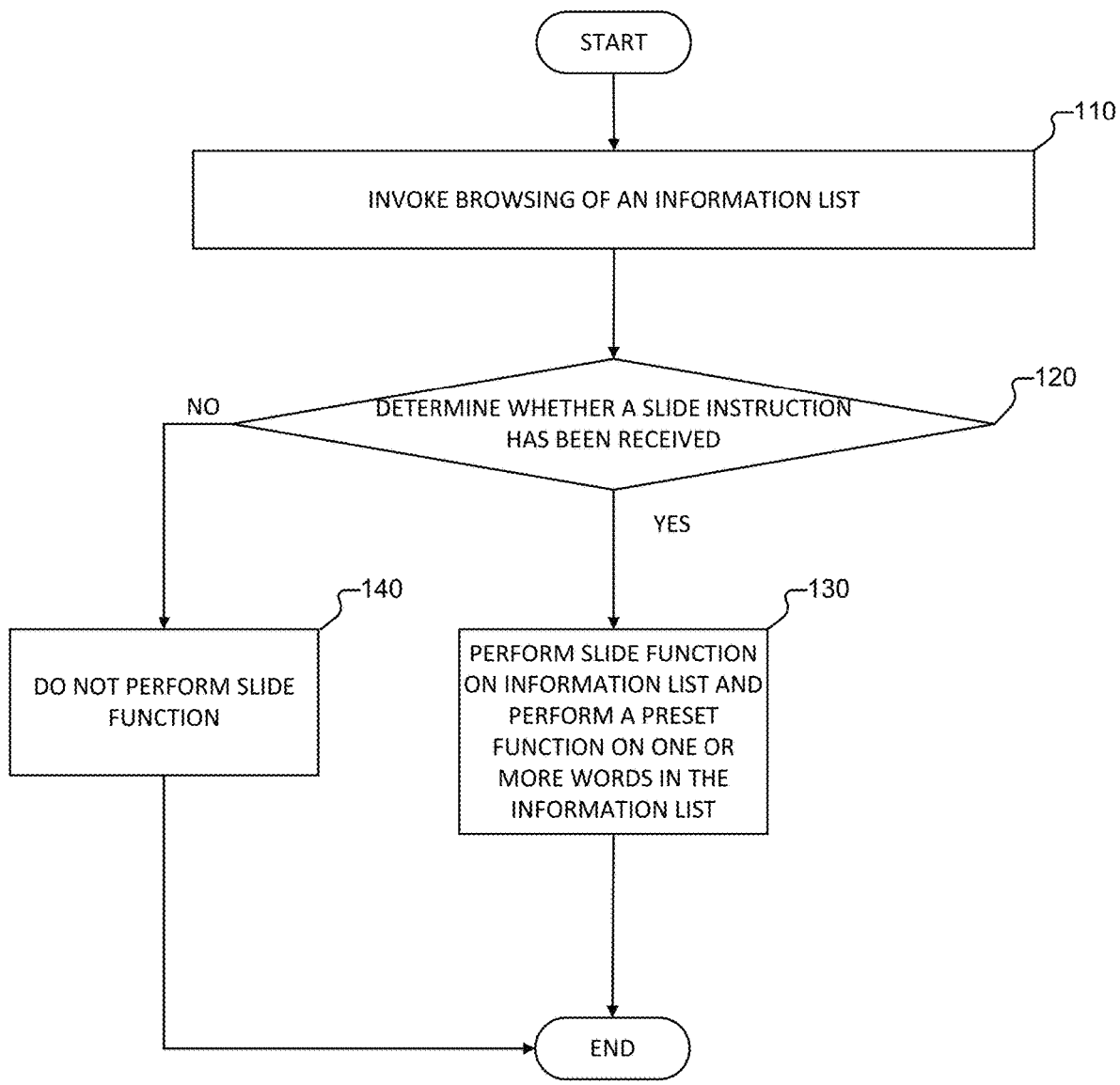
FIG. 1 is a flowchart of a method for information display according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To make the technical scheme of the present invention clearer and easier to understand, the schemes described in the present invention are explained in further detail with reference to the drawings and embodiments.

Please understand that none of the embodiments below is used to limit the schemes described by the present invention. Any modification, equivalent substitution, or improvement made within the spirit and principles of the present invention should be included within the scope protected by the present invention.

Where mentioned in the Description, "an embodiment" or "a type of embodiment" indicates that the description of the embodiment may include specific functions, structures, or characteristics, but it does not indicate that each embodiment must contain these specific functions, structures, or characteristics. In addition, persons skilled in the art should, to the extent of their knowledge, be able to think of applying the specific functions, structures, or characteristics described in an embodiment to other suitable embodiments, regardless of whether such applications have been clearly explained. In addition, the description "at least one of A, B and C" may contain the following meanings: (A, B or C), (A and B), (A and C), (B and C), and (A, B and C). Similarly, "at least one of A, B or C" may also contain the following meanings: (A, B or C), (A and B), (A and C), (B and C), and (A, B and C).

A disclosed embodiment may be implemented through hardware, firmware, software, or any combination thereof. It may also be implemented through computer programs. Said computer programs may be loaded or stored on one or more volatile or non-volatile machine-readable (e.g., computer-readable) media and may be read and executed by one or more processors. Said machine-readable media may be embodied as any storage device, means, or other physical structure (e.g., volatile or non-volatile memory or optical disks) capable of storing or transmitting information in machine-readable form.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, vehicle-mounted mobile stations, or the like. A terminal can run various operating systems.

In the attached drawings, some structures or method characteristics are shown in a specific layout and/or sequence. However, please understand that these are merely exemplary explanations and are not limited by these specific layouts and/or sequences. In addition, the structures or method characteristics appearing in a specific drawing do not indicate that these structures or method characteristics must be within all embodiments. Some embodiments may not contain these structures or method characteristics, or they may be combined with other structures or method characteristics.

FIG. 1 is a flowchart of a method for information display according to various embodiments of the present application.

Referring to FIG. 1, process 100 for information display is provided. Process 100 can be implemented in connection with process 200 of FIG. 2. Process 100 can implement existing news items list display mode 300 of FIG. 3, news list 400 of FIG. 4, key word and non-key word display modes 500 of FIG. 5, and/or key word and non-key word display modes 600 of FIG. 6. Process 100 can be implemented at least in part by system 700 of FIG. 7 and/or system 800 of FIG. 8.

At 110, browsing of an information list is detected. For example, an information list can be displayed on a display device of a terminal. The information list can comprise one or more items such as news items or other content items that respectively include content. Each content item can have metadata associated therewith. The browsing of an information list can be invoked by execution of an application. The browsing of the information list can include displaying the information list to a user in response to a present command (e.g., selection of a link or button on an interface, execution of an application, etc.). For example, in response to an application being launched (e.g., executed), an information list can be provided (e.g., displayed) to a user. The browsing of the information list can be invoked in response to a configured function of an application running on the terminal. For example, in response to selection of a feature or a function within an application running on the terminal, an information list can be provided to the user. The information list can be provided to the user in response to selection of a menu item, a button, etc.

At 120, it is determined whether a slide instruction is received. In this example, the terminal determines whether an input is received, and in response to determining whether the input is received, the terminal determines whether the input corresponds to a slide instruction. The terminal can monitor whether an input is received. For example, the terminal can monitor an input interface to determine whether an input is received. The terminal can periodically monitor the input interface, or the terminal can receive an indication that is sent in response to detection of an input to the interface. The input interface can correspond to a touch screen. However, other input interfaces can be implemented. The terminal can determine whether the input is to an information list. For example, in the event that a user is using a terminal to browse an information list, the terminal determines whether a slide instruction has been received. A slide instruction is received when a user inputs a command to an interface such as a touchscreen of the terminal. The terminal can determine whether the input (e.g., the slide instruction) is input to the information list or in connection with a browsing of the information list.

In the event that it is determined that the slide instruction is received at 120, process 100 can proceed to 130 at which a corresponding function is performed. For example, in response to determining that the slide instruction is received, a slide function can be performed. The slide function can be performed on the information list. For example, the slide function can be performed on the information that is being browsed on the terminal when the slide instruction is received, or the slide function can be performed on the information list associated with the slide instruction that is received. In some embodiments, in response to the slide instruction being received, a preset function can be performed in relation to one or more content items displayed by the terminal. For example, in response to the slide instruction being received in connection with browsing of an information list, a slide function can be performed on the information list and one or more preset functions can be performed in connection with one or more selected words comprised in the information list. The slide function can scroll content in the information list. The direction in which the content of the information list is scrolled is determined based on a slide direction associated with the slide instruction (e.g., if a slide instruction is an upward swipe, the content of the information list can be scrolled upwards).

According to various embodiments, a slide instruction corresponds to operating mode on touch screen by user. For example, the slide instruction corresponds to an input by a user to a touch screen. For example, the user can slide up and down on the information list (displayed on the touch screen). As an example, if a user inputs a slide instruction to an area of the touch screen corresponding to the information list, the user is deemed to want to look over some information. According to various embodiments, in order to help user get information in a more convenient manner, some keywords extracted from the detail information of information list are emphatically displayed.

The one or more preset functions can be performed to display the one or more selected words differently (e.g., more emphatically or less emphatically) in relation to other words in the information list. For example, the one or more preset functions can intensify a display of the one or more words such that the one or more words are shown with greater emphasis relative to the other words. The one or more words can correspond to one or more key words. The one or more words can be determined based at least in part on searching the information list for one or more key words. For example, the information list can be compared against an index of known key words. The display of the one or more key words in a different manner (e.g., more emphatic manner) in relation to other non-key words in the information list can comprise displaying the one or more key words in a different font than the non-key words or with different font properties, such that the key words are enlarged, underlined, highlighted, bolded, italicized, etc.

The one or more preset functions can comprise displaying a set of one or more words less emphatically in relation to other words comprised in the information list. Displaying a set of one or more words less emphatically in relation to other words can include displaying the set of one or more words in a different color (e.g., a lighter color), or in a smaller font, in relation to other words comprised in the information list. For example, if words in the information list are displayed in a black font, the display of the set of one or more words less emphatically in relation to other words comprised in the information list can include displaying the set of one or more words in grey. The set of one or more words that are displayed less emphatically in relation to other words comprised in the information list can correspond to non-key words. For example, one or more key words comprised in the information list can be identified and the words that are not identified as the key words (e.g., at least a subset of the words that are not identified as key words) can correspond to a set of one or more words that are displayed less emphatically (e.g., in relation to the key words).

In some embodiments, the one or more preset functions comprise displaying a first set of one or more words more emphatically in relation to the first set of one or more words as displayed before the slide instruction was received, and displaying a second set of one or more words less emphatically in relation to the second set of one or more words as displayed before the slide instruction was received.

In some embodiments, in response to receiving the slide instruction in connection with an information list (e.g., while an information list is being browsed), a slide function is performed on the information list and a preset function is performed on one or more words or on one or more items on the information list comprising the one or more words.

A slide instruction can correspond to an input that corresponds to a slide. For example, in the event that the terminal comprises a touch screen, the slide instruction can correspond to a touch input to the touch screen, wherein the touch screen is touched at one point, and the input is dragged or slid to another point on the touch screen. In some embodiments, the slide instruction corresponds to an input that is dragged or slid by at least a threshold amount. In some embodiments, the slide instruction corresponds to an input that is dragged or slid in a preset direction (e.g., up, down, right, left, etc.). A slide instruction can comprise multiple inputs each of which corresponds to an input such as dragging or sliding a finger across a touch screen. For example, an input to a touch screen that corresponds to a slide instruction can comprise multiple consecutive touch inputs that in which the touch screen is touched and a sliding motion is performed while maintaining each touch.

According to various embodiments, in response to the user executing an operation such as sliding of the screen, the user is deemed to have input a slide instruction. In response to determining that the slide instruction is received (e.g., in connection with the information list), the information list is displayed in a sliding motion that continues to scroll through the information according to the user instruction.

In some embodiments, in connection with sliding the information list, key words appearing in each piece of information on the screen (e.g., in the information list) may undergo an intensified display. For example, a processing can be performed to intensify the display of the key words. Intensifying the display of the key words can cause the user to quickly grasp the main content of each piece of information (e.g., in the information list) and can help the user to more quickly identify interesting information. Accordingly, the user's information-browsing efficiency can be increased by performing processing to intensify display (or more emphatically display) key words being displayed (e.g., in the information list).

In the event that it is determined that the slide instruction is not received at 120, process 100 can proceed to 140 at which a corresponding function is performed. If a slide instruction has not be received (e.g., detected), the terminal can continue to monitor for receipt (e.g., input) of a slide instruction. In some embodiments, if a slide instruction has not be received (e.g., detected), the terminal can perform another corresponding function. For example, if an input is input to the terminal and it is determined that the input does not correspond to a slide instruction, then the terminal can perform a function corresponding to the input that is input to the terminal.

In some embodiments, non-key words appearing in each piece of information on the screen (e.g., in the information list) can be displayed so as to be weakened in order to further highlight the key words. The non-key words comprised in the information list can undergo a processing to weaken the display of such non-key words. Accordingly, the user's information-browsing efficiency can be increased.

Extracting key words from the information list can be performed in connection with the slide function and/or the preset function performed in relation to one or more content items displayed by the terminal. For example, performing the one or more preset functions in connection with one or more words comprised in the information list can comprise extracting one or more key words from the information list.

In some embodiments, the one or more key words are extracted in advance of the performing the one or more preset functions in connection with one or more words comprised in the information list. The one or more key words can be individually extracted from each piece of information (e.g., each item included in the information list) in advance and the extraction results can be stored. The extraction results can be referenced or called upon in response to determining that the slide instruction is received. In some embodiments, in response to subsequently determining for each piece of information (e.g., for an item comprised in the information list) that any recorded key word in that piece of information appears on the screen, that corresponding key word can undergo intensified display.

Figure 2:
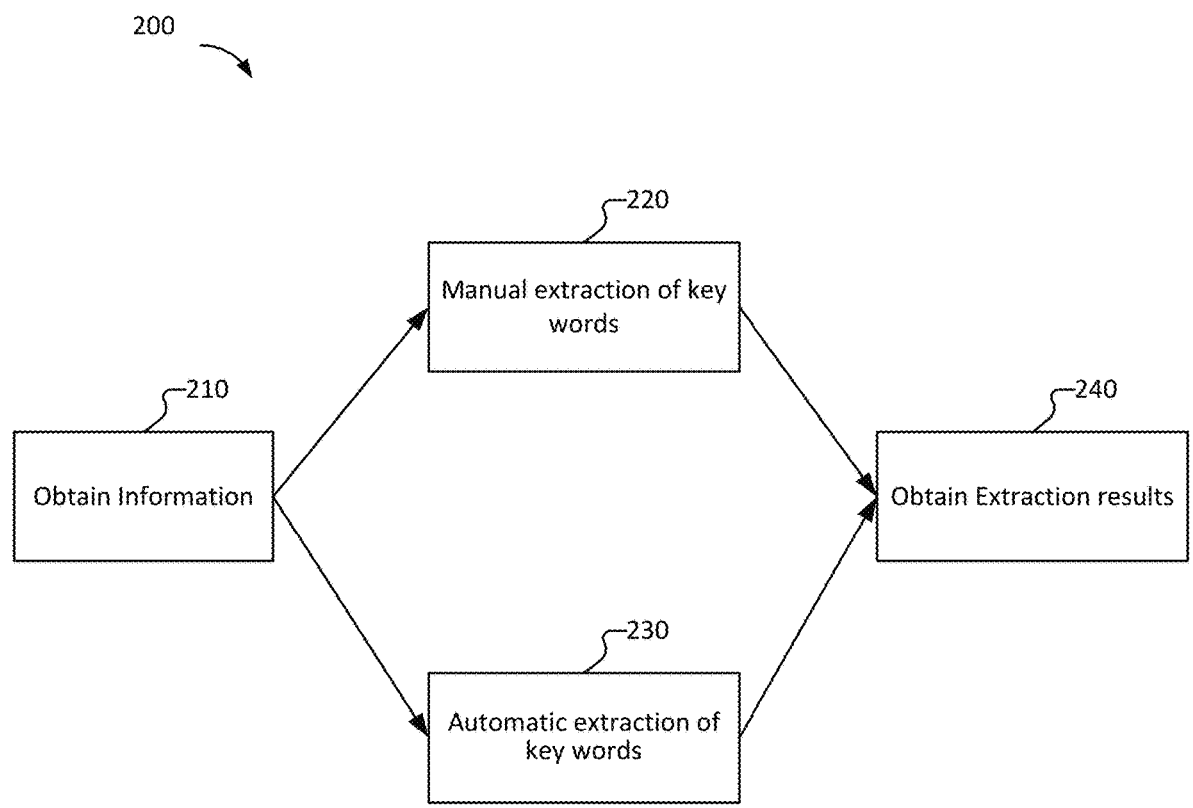
FIG. 2 is a diagram of a process for key word extraction according to various embodiments of the present application.

FIG. 2 is a diagram of a process for key word extraction according to various embodiments of the present application.

Referring to FIG. 2, process 200 for key word extraction is provided. Process 200 can be implemented in connection with process 100 of FIG. 1. For example, process 100 of FIG. 1 can implement process 200. Process 200 can be implemented in connection with existing news items list display mode 300 of FIG. 3, news list 400 of FIG. 4, key word and non-key word display modes 500 of FIG. 5, and/or key word and non-key word display modes 600 of FIG. 6. Process 200 can be implemented at least in part by system 700 of FIG. 7 and/or system 800 of FIG. 8.

As illustrated in FIG. 2, a manual extraction method 220 can be performed, and/or an automatic extraction method 230 can be performed. In some embodiments, a combination of an automatic extraction method 230 and a manual extraction method 220 is implemented.

The obtained extraction results can be stored. The extraction results can be stored locally at the terminal, or remotely at a data storage that is accessible via a network (e.g., a cloud storage, on a server, etc.).

Process 200 can include obtaining information 210. Information 210 can correspond to information that is to be subjected to key word extraction. For example, information 210 can comprise an information list. Information 210 can correspond to an item comprised in an information list. In some embodiments, process 200 for extracting key words is performed on an item-by-item basis for items comprised in an information list. In some embodiments, process 200 for extracting key words is performed on more than one item comprised in the information list. For example, process 200 can be performed against an entire information list.

It can be determined whether to perform a manual extraction method 220, automatic extraction method 230, or a combination thereof. For example, in response to obtaining information 210, it can be determined whether to perform a manual extraction method 220, automatic extraction method 230, or a combination thereof. The terminal can determine whether to perform a manual extraction method 220, automatic extraction method 230, or a combination thereof based on a pre-chosen configuration setting.

In some embodiments, the manual extraction method 220 includes a provider of the information 210 extracting one or more key words from the information 210, or otherwise identifying the one or more key words in the information 210. For example, the manual extraction method 220 can comprise a worker of the provider of information 210 manually identifying the one or more key words for the information 210. The worker of the provider can input or otherwise select the one or more key words for the information to a terminal or system associated with the provider.

Determination of when to use the manual extraction method 220 and when to use the automatic extraction method 230 or other method can be based on a context of the terminal or a characteristic of information 210 (e.g., an information type of information 210, etc.). For example, certain words can be deemed as key words for purposes of advertising or promotion. However, if the automatic extraction method 230 is employed, such key words probably may not be extracted. For example, identifying the key words in advertising or promotional information via the automatic extraction method 230 can be difficult (e.g., determining key words for which a user is interested in connection with an advertisement can be difficult). Accordingly, it could be determined that the manual extraction method 220 is to be employed for extracting such key words. In some embodiments, the determination of whether to use manual extraction method 220, automatic extraction method 230, or a combination thereof, or another extraction method can be made on a key word-by-key word basis. For example, manual extraction method 220 can be performed in connection with extracting a first set of key words and automatic extraction method 230 can be performed in connection with extracting a second set of key words. In some embodiments, the determination of whether to use manual extraction method 220, automatic extraction method 230, or a combination thereof, or another extraction method can be made based on a purpose for which information 210 is being displayed (e.g., a content that is responsive to a query, content relevant to the application in which information is being displayed, content being displayed for advertisement purposes, etc.).

Automatic extraction method 230 can comprise using a preset extraction algorithm. The preset extraction algorithm can be run against information 210. For example, the preset extraction algorithm can comprise the existing Term Frequency-Inverse Document Frequency (TF-IDF) extraction algorithm. As another example, the preset extraction algorithm can include the longest common sequence (LCS) technique.

Extraction results 240 can be obtained based on results from manual extraction method 220 and/or automatic extraction method 230. For example, if manual extraction method 220 and automatic extraction method 230 are performed, results from manual extraction method 220 and results from automatic extraction method 230 can be aggregated to determine the extraction results 240.

Extraction results 240 can be stored. Extraction results 240 can be stored locally at the terminal, or remotely at a data storage that is accessible via a network (e.g., a cloud storage, on a server, etc.). The extracted key words themselves can recorded, and/or the positions of the extracted key words in information 210 at which the extracted key words are located can be stored. Other metadata associated with the extracted key words can be stored.

The stored extracted key words can be obtained in connection with performing the preset function in response to determining that the slide instruction is received.

After key word extraction and recording are completed in accordance with the method described above, and when a user uses a smart terminal to conduct information-list browsing, the key words in each piece of information appearing on the screen can immediately (e.g., contemporaneously) undergo intensified display during the process of sliding the information list according to the received user instruction. Similarly or in addition to, the non-key words in each piece of information appearing on the screen (e.g., in the information list) can immediately (e.g., contemporaneously) undergo weakened display.

As an example, the font of the key words may be enlarged and bolded so as to achieve intensified (e.g., emphasized) display of the key words. As another example, the non-key words can be subjected to graying and semi-transparency treatment in order to weaken (e.g., de-emphasize) display of the non-key words.

The key words in the information list can be transitioned from an original default display mode to an intensified display mode through transition animation, and the non-key words can be transitioned from an original default display mode to a weakened display mode through transition animation. The terminal can perform the transition animations on the key words and/or the non-key words. As an example, key words can undergo a transition mode from small to large, or from thin to thick. The transition mode from small to large can comprise enlarging a font size of the key words. The transition mode from thin to thick can comprise increasing the line thickness of the font of the key words. As another example, non-key words may undergo a bright-to-dim transition mode. The transition mode from bright to dim can comprise decreasing a brightness of the non-key words, changing a color of the font of the non-key words, etc. The performing of the transition modes can gradually change one or more characteristics of the key words or non-key words, as applicable.

Transition animation can be used to keep the change in display modes of the key words and/or non-key words from occurring too suddenly. With a gradual, smooth change, the user's visual experience may be enhanced, and image flickering can be prevented.

In response to determining that the slide instruction is stopped (e.g., when the user stops scrolling through the information list), the slide function being performed (e.g., on the information being browsed on the terminal) can be stopped. In addition, in response to determining that the slide instruction is stopped, one or more preset functions can be performed in connection with one or more words. For example, the one or more preset functions performed in response to determining that the slide instruction has been received can be reversed. If the one or more preset functions performed in response to determining that the slide instruction has been received comprise displaying the one or more words more emphatically in relation to other words in the information list, then in response to determining that the slide instruction is stopped, the one or more words that were displayed more emphatically can be displayed according to the original form of such one or more words. If the one or more preset functions performed in response to determining that the slide instruction has been received comprise displaying the one or more words to be less emphatic (e.g., to be de-emphasized) in relation to other words in the information list, then in response to determining that the slide instruction is stopped, the one or more words that were displayed less emphatically can be displayed according to the original form of such one or more words.

For example, when the sliding instruction stops, the key words in each piece of information appearing on the screen can be restored to the display mode that preceded intensified display and the non-key words in each piece of information appearing on the screen can be restored to the display mode that preceded weakened display (e.g., key words and non-key words are restored to their respective prior default display modes).

As another example, when the sliding instruction stops, a transition animation can be performed to transition the key words to the display mode that preceded intensified display, and, transition animation can be performed to transition the non-key words to the mode of display that preceded weakened display.

The information 210 can be manifested in various forms, such as news or other content. If information 210 is news, the extractions of key words from the information generally refers to the extraction of key words from news headlines.

Figure 3:
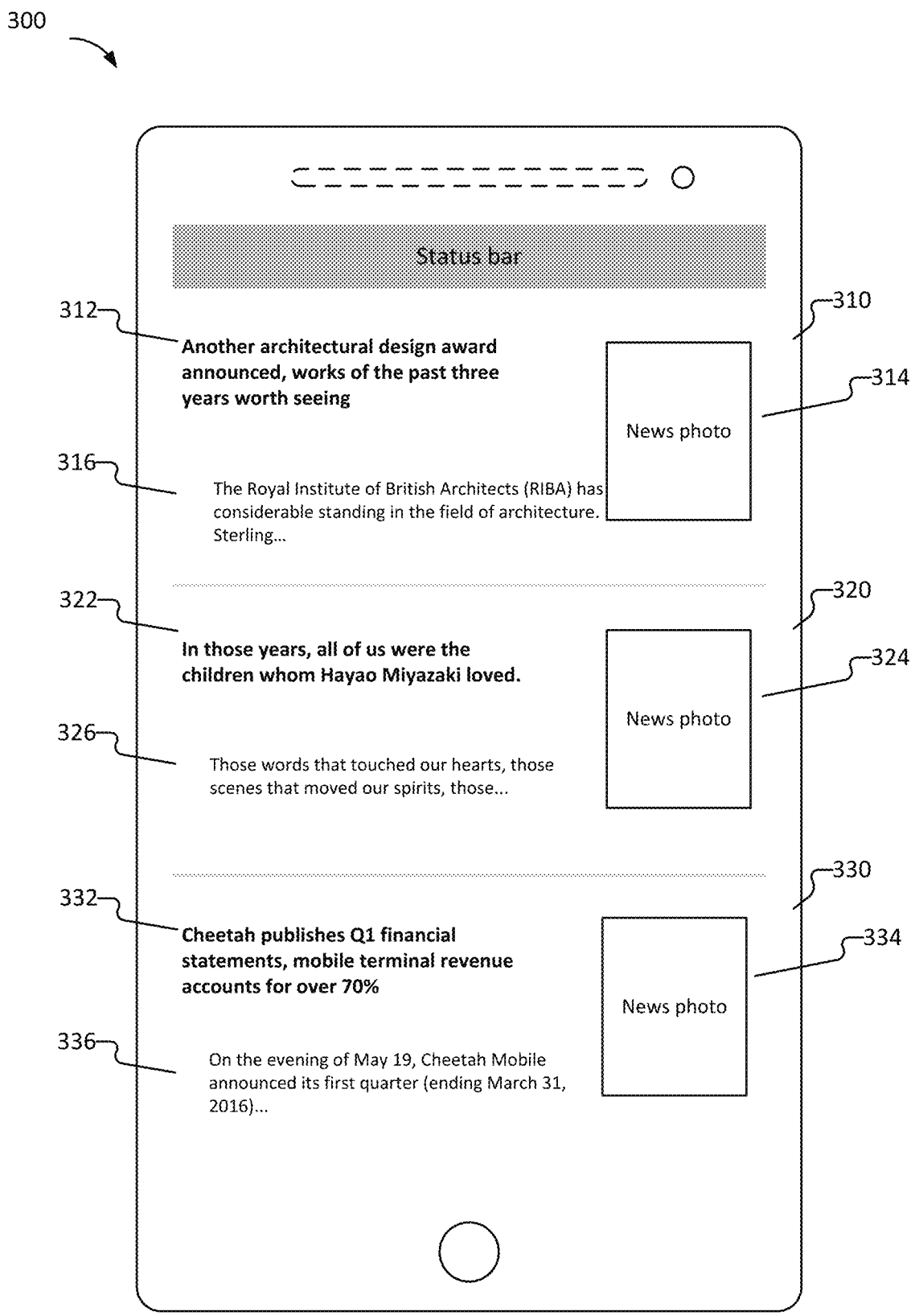
FIG. 3 is an illustration of an existing news list mode of display according to various embodiments of the present application.

FIG. 3 is an illustration of an existing news list mode of display according to various embodiments of the present application.

Referring to FIG. 3, news list 300 is provided. News list 300 can be implemented in connection with (e.g., subject to) process 100 of FIG. 1, and/or process 200 of FIG. 2. News list 300 can be implemented at least in part by system 700 of FIG. 7 and/or system 800 of FIG. 8.

A news application generally provides multiple news items in an information list. For example, when a user uses a news application to browse news, the user generally will see multiple news items displayed sequentially in the form of a top-to-bottom list. As shown in FIG. 3, news item 310, news item 320, and news item 330 are displayed in an information list. The information list can be displayed in the form of a top-to-bottom list, in the form of a horizontal list (e.g., left-to-right), etc. Each news item may include a headline, a small body of text, a news photo, etc. For example, news item 310 can comprise headline 312, news photo 314, body of text 316, etc.; news item 320 can comprise headline 322, news photo 324, body of text 326, etc.; news item 330 can comprise headline 332, news photo 334, body of text 336, etc. To take as an example the first news item, its headline is "Another architectural design award announced, works of the past three years worth seeing." The body of text is, "The Royal Institute of British Architects (RIBA) has considerable standing in the field of architecture. Sterling . . . "

Key words can be extracted from each news item before the corresponding news item is published. The key words can be extracted according to the manual extraction method and/or the automatic extraction method. The extraction results of the manual extraction method and/or the automatic extraction method can be stored.

The key words can be extracted from the headline, the small body of text, the news photo, metadata associated with the news item (or associated with any of the headline, the small body of text, the news photo), or any combination thereof.

The extracted key words themselves can be recorded, or the positions of the extracted key words in the news items (e.g., the positions of the extracted key words in the headlines) at which the key words are located can be recorded.

The positions of the extracted key words in the headlines at which the key words are located can be recorded as shown in Table 1:

TABLE 1

| | Records of the positions of the extracted key words in the headlines where they are located |  |
|---|---|---|
| Headline | Cheetah publishes Q1 financial statements, mobile terminal revenue accounts for over 70% | |
| Key words | Cheetah | [1] |
| | mobile terminal | [6, 7] |
| | revenue | [8] |

Referring to Table 1, key words are extracted from news item 330 (e.g., from headline 332 of news item 330). [1] indicates that the position of the key word "Cheetah" is word 1 in the headline. [6, 7] indicates that the position of the key word "mobile terminal" is words 6 through 7 in the headline. [8] indicates that the position of the key word "revenue" is word 8 in the headline. The position of the key words can be expressed as the position of the characters for the corresponding key word.

When news list 300 is displayed (e.g., by the news application running on the terminal), a user can, by an operation such as upward sliding of the screen, engage in preliminary browsing of the content of each subsequent news item in order to locate news of interest. If the news list 300 is undergoing a sliding process, the key words and/or non-key words can undergo processing. As an example, in the sliding process, the key words in each news item appearing on the screen can undergo intensified display, and the non-key words in each news item appearing on the screen can undergo weakened display. During display of the news list 330 and the display of the news list 330 during the sliding process (e.g., during input of a sliding instruction), it can be determined whether a news item includes a key word. For example, for each news item being displayed it can be determined whether a news item includes a key word.

As it is determined for each news item that any recorded key word in that news item appears on the screen, a preset function can be performed on one or more key words appearing on the screen. For example, one or more of the key words can undergo intensified display.

Figure 4:
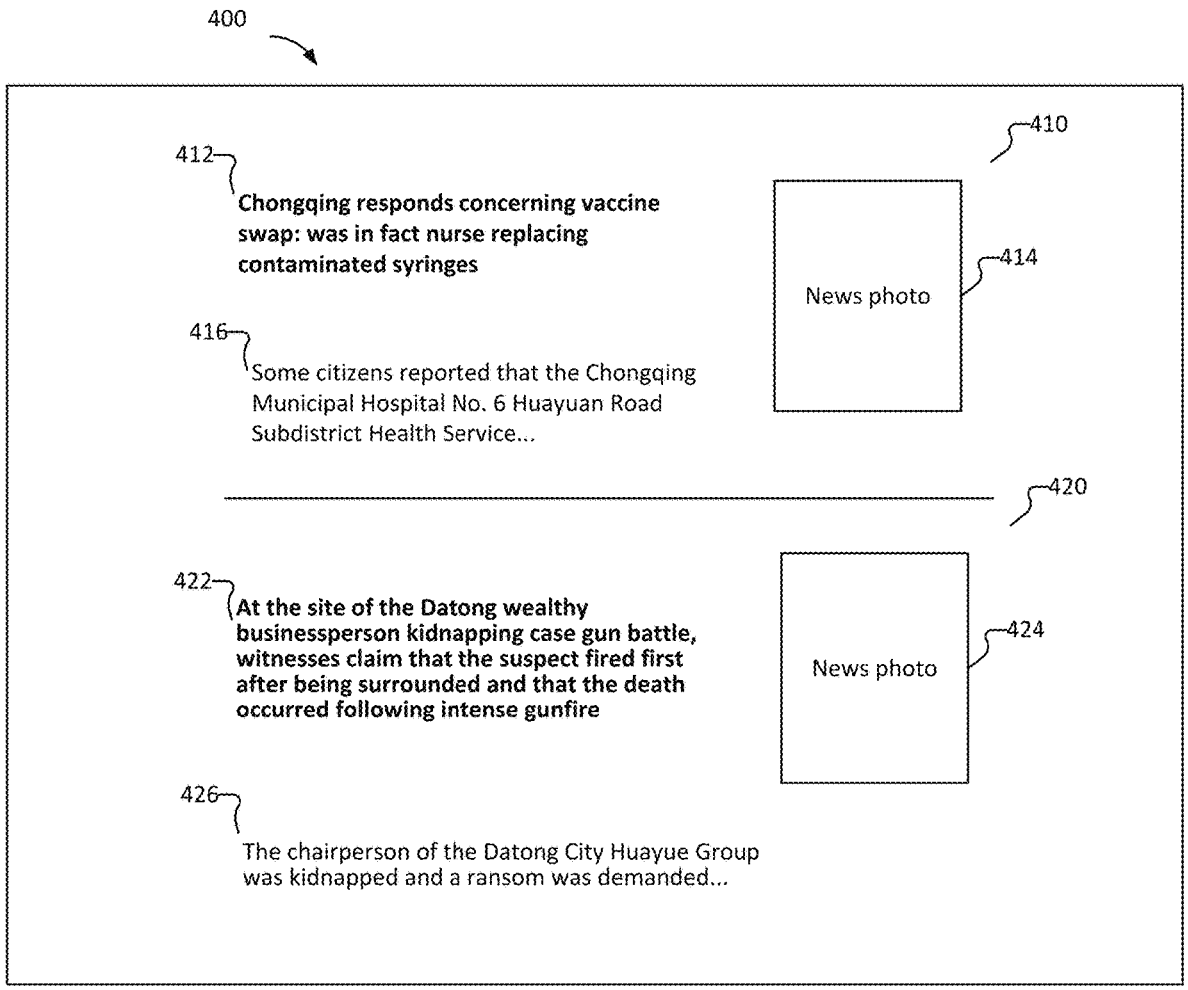
FIG. 4 is an illustration of two news items in an existing news list according to various embodiments of the present application.

FIG. 4 is an illustration of two news items in an existing news list according to various embodiments of the present application.

Referring to FIG. 4, news list 400 is provided. News list 400 can be implemented in connection with (e.g., subject to) process 100 of FIG. 1, and/or process 200 of FIG. 2. News list 400 can be implemented at least in part by system 700 of FIG. 7 and/or system 800 of FIG. 8.

As shown in FIG. 4, news item 410 and news item 420 are displayed in an information list. The information list can be displayed in the form of a top-to-bottom list, in the form of a horizontal list (e.g., left-to-right), etc. Each news item may include a headline, a small body of text, a news photo, etc. For example, news item 410 can comprise headline 412, news photo 414, body of text 416, etc.; and news item 420 can comprise headline 422, news photo 424, body of text 426, etc.

In the event that a user executes an upward screen sliding operation (e.g., inputs a sliding instruction) on the news list 300 of FIG. 3, the news item 410 and news item 420 of FIG. 4 will appear in sequence.

Figure 5:
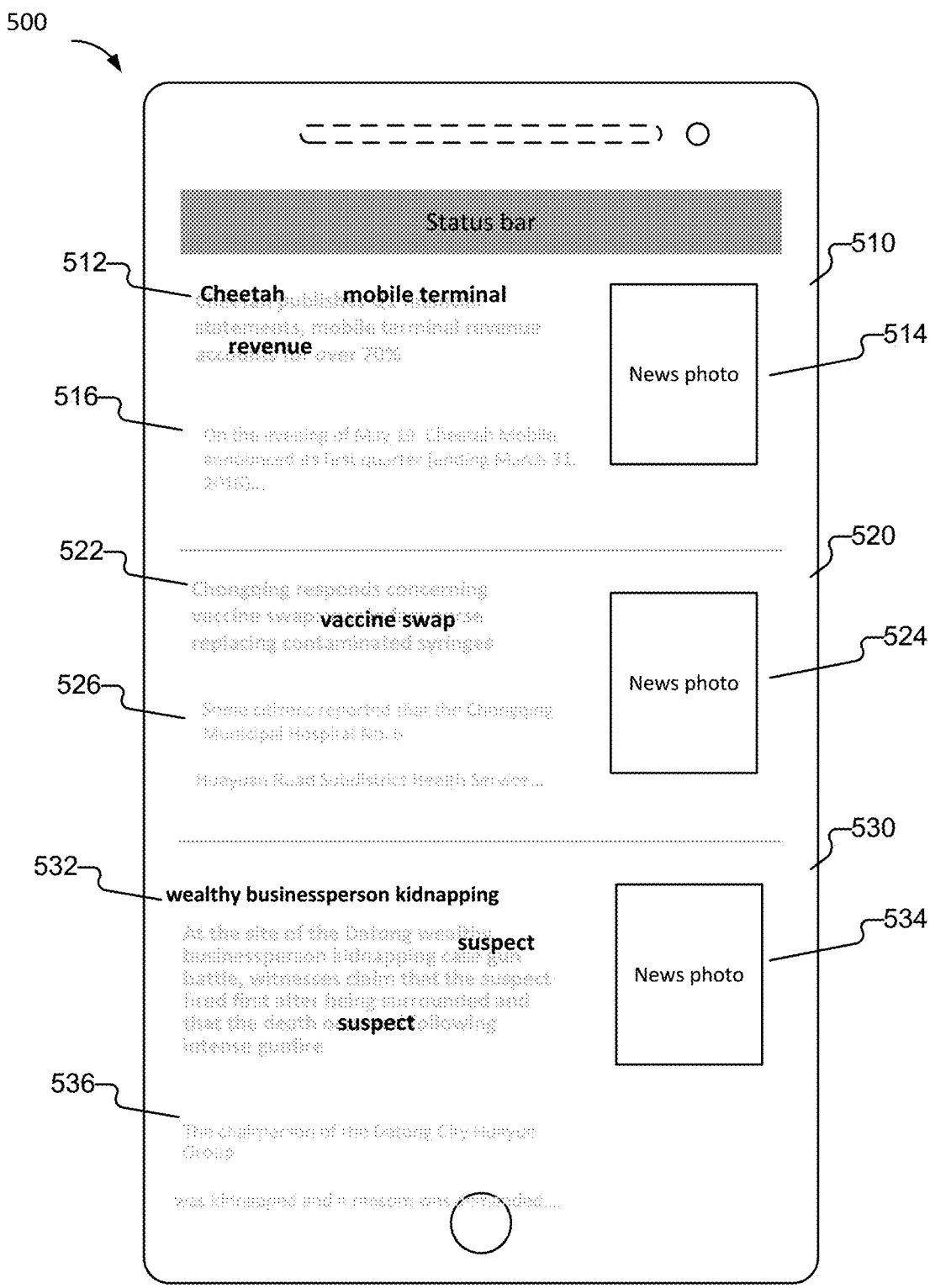
FIG. 5 is an illustration of key word and non-key word display modes during a sliding process according to various embodiments of the present application.

FIG. 5 is an illustration of key word and non-key word display modes during a sliding process according to various embodiments of the present application.

Referring to FIG. 5, news list 500 is provided. News list 500 can be implemented in connection with (e.g., subject to) process 100 of FIG. 1, and/or process 200 of FIG. 2. News list 500 can be implemented at least in part by system 700 of FIG. 7 and/or system 800 of FIG. 8.

As shown in FIG. 5, news item 510, news item 520, and news item 530 are displayed in an information list. The information list can be displayed in the form of a top-to-bottom list, in the form of a horizontal list (e.g., left-to-right), etc. Each news item may include a headline, a small body of text, a news photo, etc. For example, news item 510 can comprise headline 512, news photo 514, body of text 516, etc.; news item 520 can comprise headline 522, news photo 524, body of text 526, etc.; and news item 530 can comprise headline 532, news photo 534, body of text 536, etc.

News list 500 of FIG. 5 comprises key words processed according to a key word display mode and non-key words processed according to a non-key word display mode during the sliding process (e.g., in connection with a sliding instruction being input). As illustrated in FIG. 5, a total of three news items appear on the screen at a certain moment in the sliding process. If the key words extracted from the headline of the third news item shown in FIG. 3 (e.g., news item 330) are "Cheetah," "mobile terminal," and "revenue"; that the key words extracted from the headline of the first news item of FIG. 4 (e.g., news item 410) are "vaccine" and "swap"; and that the key words extracted from the headline of the second news item of FIG. 4 (e.g., news item 420) are "wealthy businessperson," "kidnapping," "suspect," and "death." One or more preset functions can be performed in connection with one or more words comprised in the news list 500. For example, one or more preset functions can be performed to display the key words of news item 510, news item 520, and news item 530 more emphatically in relation to other words in the news list 500. For example, the key words in each headline (e.g., headline 512, headline 522, and headline 532) can undergo separate intensified display, and the content other than the key words can undergo weakened display.

The three news items (e.g., news item 510, news item 520, and news item 530) shown in FIG. 5 have already completely appeared on the screen. Because the sliding process is the process of change in real time, the content which appears at different moments on the screen will vary. At one moment, perhaps one news item will have only part of its corresponding headline appearing on the screen. For example, assume that only the first line of the headline of the second news item shown in FIG. 4 (e.g., news item 420) appears on the screen. This line includes the key words "wealthy businessperson" and "kidnapping." Therefore, the key words "wealthy businessperson" and "kidnapping" undergo intensified display. At the same time, the non-key words in this line undergo weakened display. Subsequently, when the second line appears on the screen, the news item 420 includes the key word "suspect." Therefore, the key word "suspect" can undergo intensified display, while the non-key words in the second line undergo weakened display, and so on in this manner.

The key words can be transitioned from an original default display mode to an intensified display mode by using a transition animation, and the non-key words can be transitioned from an original default display mode to a weakened display mode by using a transition animation.

The sliding function can stop when the sliding instruction stops. For example, if the user is more interested in the "vaccine swap" news of news item 520, then the user can stop the sliding instruction (e.g., stop scrolling through the news items by pausing the sliding motion on the touch screen). Accordingly, the key words in each news item appearing on the screen can be restored to the default display mode that preceded intensified display, and the non-key words in each news item appearing on the screen can be restored to the default display mode that preceded weakened display.

The key words can be transitioned to the display mode that preceded intensified display by using a transition animation, and, the non-key words can be transitioned to the mode of display that preceded weakened display by using a transition animation.

Figure 6:
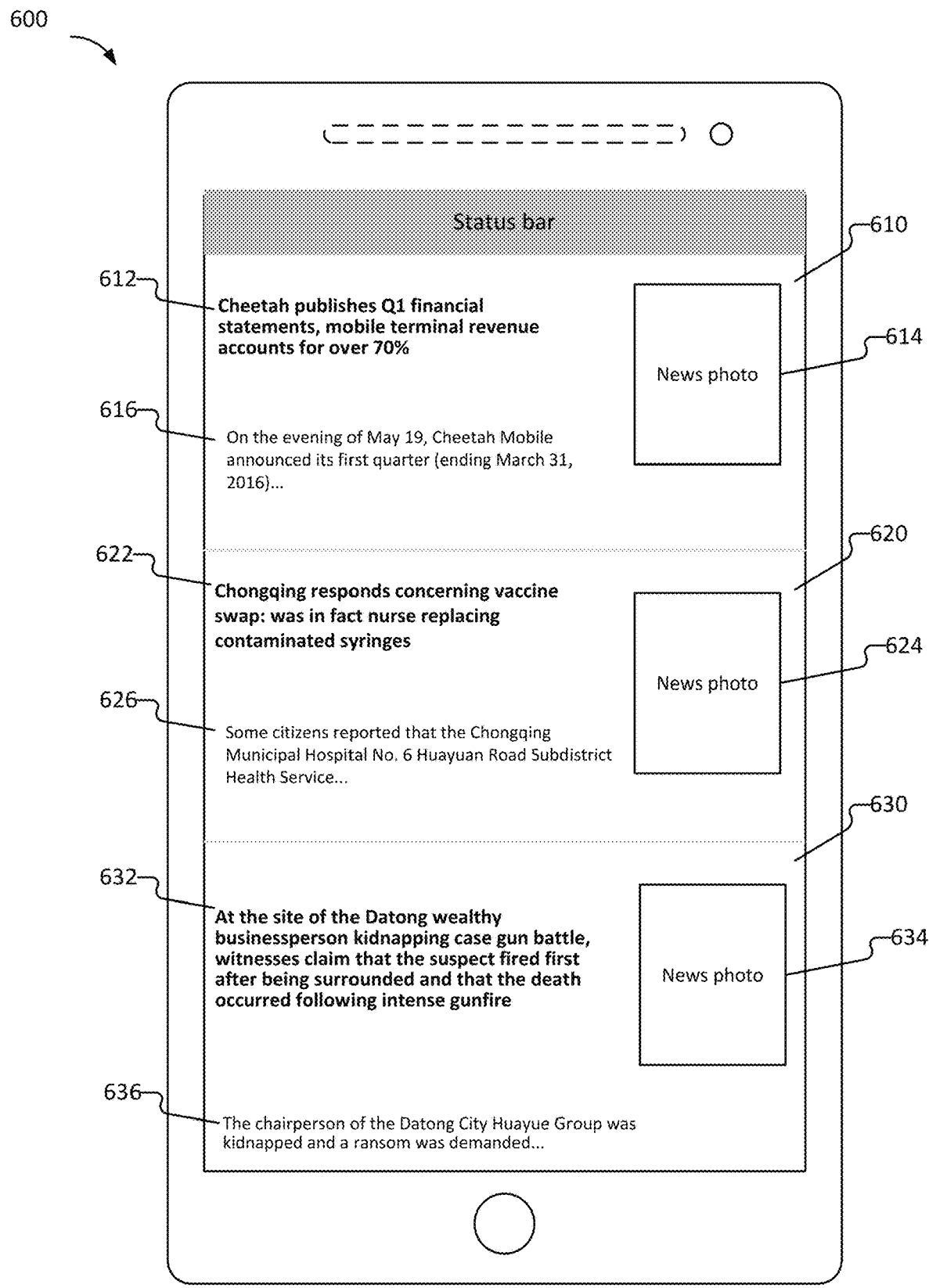
FIG. 6 is an illustration of key word and non-key word display modes after sliding stops according to various embodiments of the present application.

FIG. 6 is an illustration of key word and non-key word display modes after sliding stops according to various embodiments of the present application.

Referring to FIG. 6, news list 600 is provided. News list 600 can be implemented in connection with (e.g., subject to) process 100 of FIG. 1, and/or process 200 of FIG. 2. News list 600 can be implemented at least in part by system 700 of FIG. 7 and/or system 800 of FIG. 8.

As shown in FIG. 6, news item 610, news item 620, and news item 630 are displayed in an information list. The information list can be displayed in the form of a top-to-bottom list, in the form of a horizontal list (e.g., left-to-right), etc. Each news item may include a headline, a small body of text, a news photo, etc. For example, news item 610 can comprise headline 612, news photo 614, body of text 616, etc.; news item 620 can comprise headline 622, news photo 624, body of text 626, etc.; and news item 630 can comprise headline 632, news photo 634, body of text 636, etc.

News list 600 can be provided after the sliding stops while the status corresponds to news list 500 illustrated in FIG. 5. As shown in FIG. 6, the key words and non-key words in the three news items shown in FIG. 5 (e.g., news item 510, news item 520, and news item 530) will separately be restored to the default display mode (e.g., restored to normal status such that the text is displayed according to its normal formatting) as illustrated by news item 610, news item 620, and news item 630. If the user is interested in any of news item 610, news item 620, and news item 630, the user can click to view detailed content for the corresponding news item.

According to various embodiments, key words undergo intensified display, enabling the user to quickly grasp the main content of the news and thus making it easier for the user to identify news or content of interest and increasing the user's news-browsing efficiency.

The key words can be transitioned from an original default display mode to an intensified display mode based on a transition animation, and the non-key words can be transitioned from an original default display mode to a weakened display mode based on a transition animation.

When the sliding instruction stops, the key words in each piece of information appearing on the screen can be restored to the display mode that preceded intensified display, and the non-key words in each piece of information appearing on the screen can be restored to the display mode that preceded weakened display (e.g., key words and non-key words can be restored to their respective prior default display modes).

The extraction results can refer to the extracted key words themselves or to the positions of the extracted key words in the headline at which the corresponding extracted key words are located.

When the user is browsing a news list and is performing a slide operation (e.g., inputting a slide instruction), the key words in each news item appearing on the screen can be subjected to (e.g., processed to exhibit) intensified display while simultaneously subjecting non-key words in each news item appearing on the screen to weakened display.

When the sliding instruction stops, the key words in each news item appearing on the screen can be restored to the display mode that preceded intensified display and the non-key words in each news item appearing on the screen can be restored to the display mode that preceded weakened display (e.g., restore key words and non-key words to their respective prior default display modes).

Figure 7:
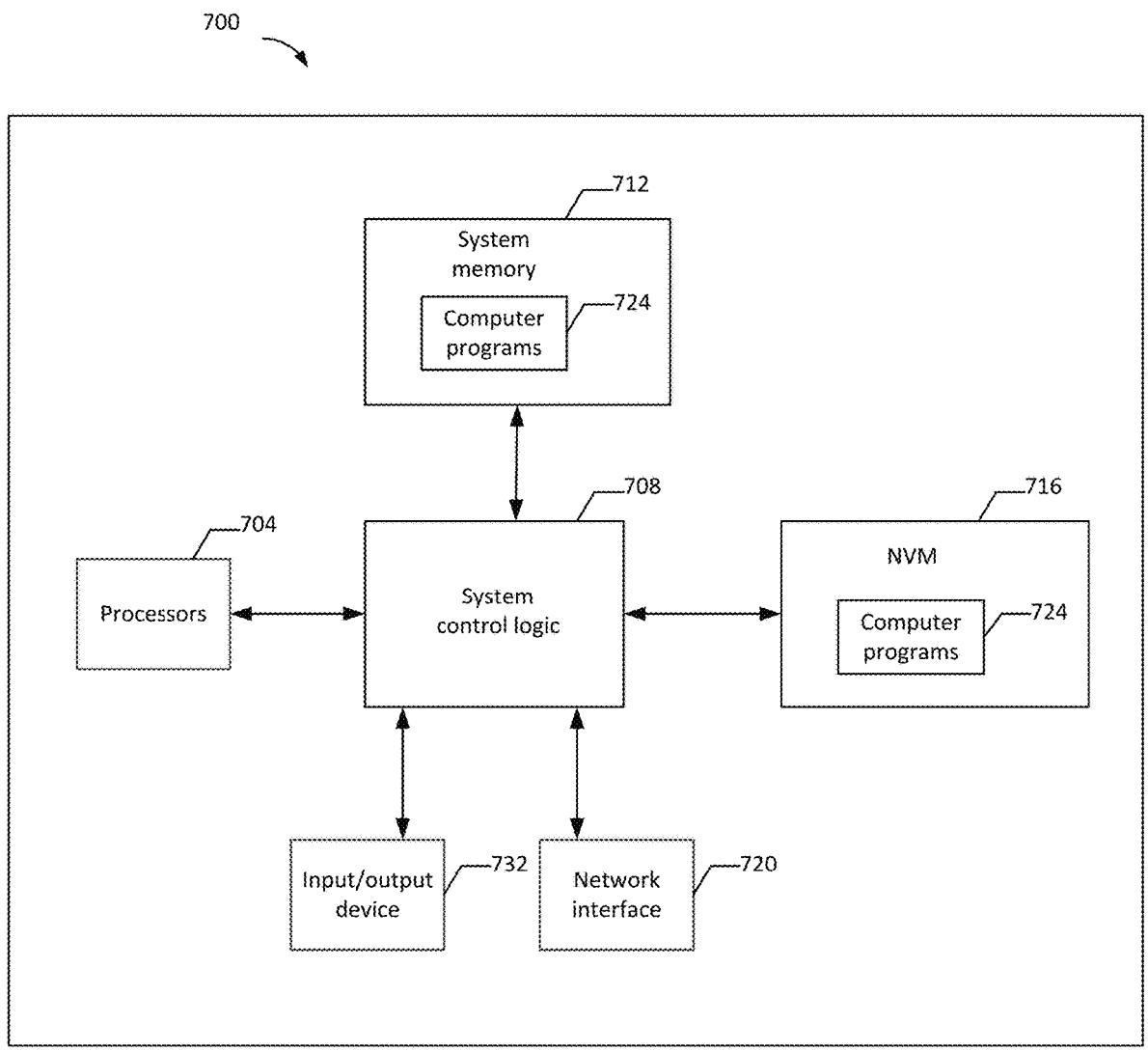
FIG. 7 is a diagram of a system for information display according to various embodiments of the present application.

FIG. 7 is a diagram of a system for information display according to various embodiments of the present application.

Referring to FIG. 7, system 700 for information display is provided. System 700 can implement process 100 of FIG. 1, and/or process 200 of FIG. 2. System 700 can implement existing news items list display mode 300 of FIG. 3, news list 400 of FIG. 4, key word and non-key word display modes 500 of FIG. 5, and/or key word and non-key word display modes 600 of FIG. 6. System 700 can be implemented at least in part by system 800 of FIG. 8.

System 700 can comprise: one or more processors 704, system control logic 708 connected to at least one processor 704, system memory 712 connected to the system control logic 708, non-volatile memory (NVM) 716 connected to system control logic 708, and a network interface 720 connected to system control logic 708.

The one or more processors 704 can control one or more single-core or multi-core processors. The one or more processors 704 can comprise any combination of general-purpose processors and special-purpose processors (e.g., graphics processors, application processors, baseband processors, etc.).

The system control logic 708 can comprise any suitable interface control so as to provide a suitable interface for the processors 704 and/or other devices or components communicating with the system control logic 708.

The system control logic 708 can comprise one or more memory controllers so as to provide an interface for system memory 712, etc. The system memory 712 may be used to load and store data and/or computer programs. The system memory 712 may comprise any suitable volatile memory (e.g., dynamic random-access memory (DRAM)).

NVM 716 can comprise one or more temporary or non-temporary computer-readable media for storing data and/or computer programs. For example, NVM 716 can include any suitable non-volatile memory, such as flash memory and/or include any suitable non-volatile storage device such as one or more hard disk drives (HDD), one or more optical disk drives, and/or one or more digital versatile disk (DVD) drives.

NVM 716 may comprise some storage resources on a device, either installed on system 700 or accessible thereby. However, such storage resources are not necessarily a part of the device. For example, NVM 716, with help from the network interface 720, could access such storage resources via a network.

System memory 712 and NVM 716 may separately comprise, in particular, the temporary and permanent (e.g., to be stored long term) copies of the computer programs 724. In the event that at least one processor 704 executes a program among the computer programs 724, system 700 will execute the method described in the aforesaid method embodiments. In some embodiments, the computer programs 724 or corresponding hardware, firmware, and/or software components may additionally/alternatively be located in the system control logic 708 and/or one or more processors 704.

The network interface 720 can have a transceiver so that system 700 can communicate with other suitable devices via one or more networks. The network interface 720 can comprise any suitable hardware and/or firmware. The network interface 720 can comprise multiple antennae so as to provide multiple input and multiple output wireless interfaces. The network interface 720 can comprise a network adapter, a wireless network adapter, a telephone modem, and/or a wireless modem.

In some implementations, it is possible to package at least one processor 704 together with the logic of one or more controllers in the system control logic 708 and thus to form a system-in-package (SiP). In some implementations, it is possible to integrate at least one processor 704 with the logic of one or more controllers in the system control logic 708 onto the same bare chip and thus to form a system-on-chip (SoC).

System 700 can further comprise an input/output device 732. The input/output device 732 can comprise: a user interface for exchanging information between the user and system 700, a peripheral component interface for exchanging information between peripheral components and system 700, and/or a sensor for acquiring environmental parameters and/or position information relating to system 700.

User interfaces include, but are not limited to: a display device (such as a liquid crystal display or a touchscreen), a loudspeaker, a microphone, a camera (e.g., a still-image camera and/or a moving-image camera), and a keyboard.

The peripheral component interfaces include but are not limited to: non-volatile memory ports, audio ports, and a power supply interface.

Sensors include, but are not limited to: a gyro sensor, an accelerometer, a proximity sensor, an ambient light sensor, and a positioning unit. A positioning unit can be a part of the network interface 720, or the positioning unit can interact with the network interface in order to communicate with a positioning component, such as a global positioning system (GPS) satellite.

System 700 may be a mobile computing device. For example, system 700 could be, but is not limited to: a notebook computer, a tablet computer, a netbook, or a mobile phone. In addition, system 700 can further have more or fewer components and/or different architectures.

Figure 8:
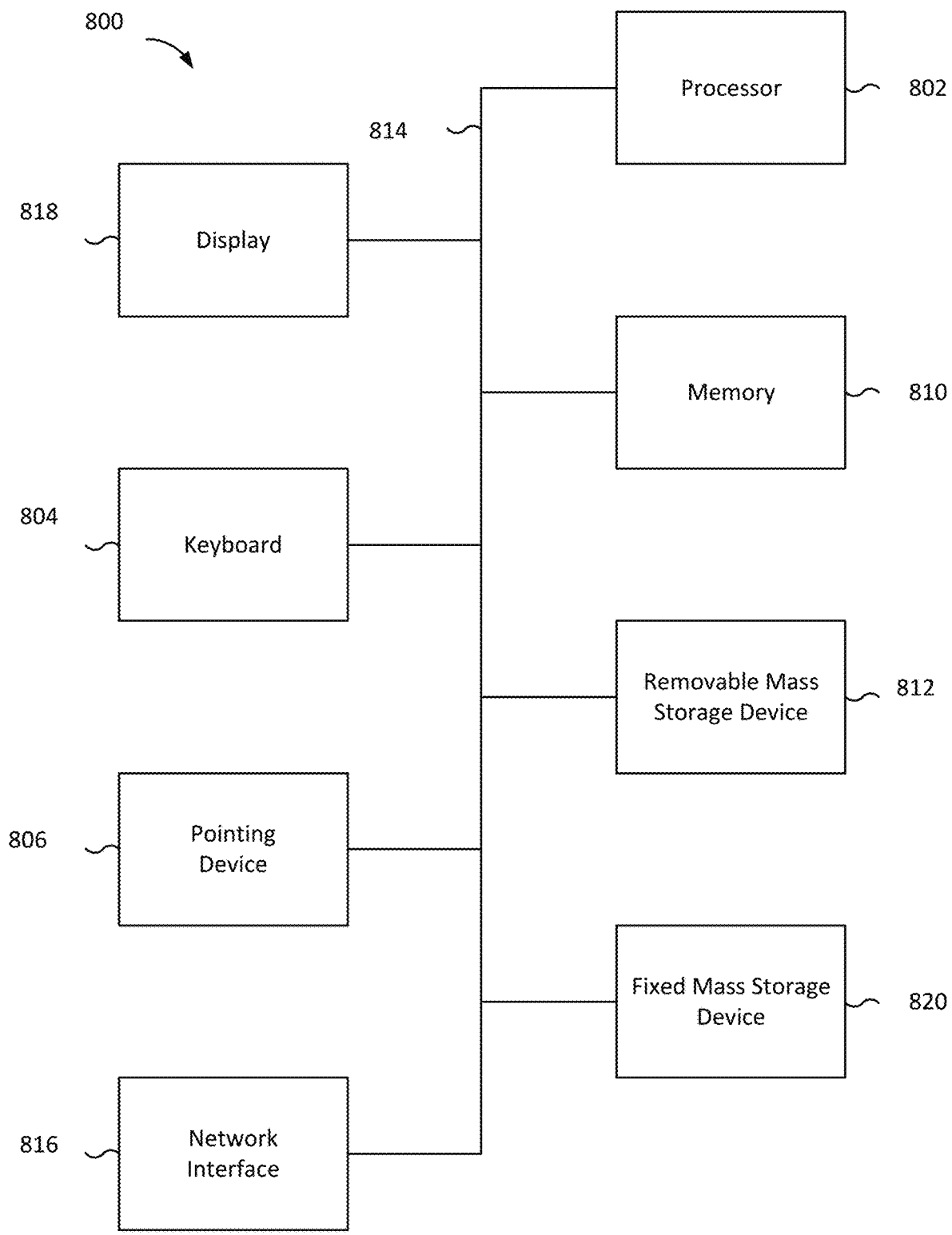
FIG. 8 is a functional diagram of a computer system for information display according to various embodiments of the present disclosure.

FIG. 8 is a functional diagram of a computer system for information display according to various embodiments of the present disclosure.

Referring to FIG. 8, system 800 for information display is provided. System 800 can implement process 100 of FIG. 1, and/or process 200 of FIG. 2. System 700 can implement existing news items list display mode 300 of FIG. 3, news list 400 of FIG. 4, key word and non-key word display modes 500 of FIG. 5, and/or key word and non-key word display modes 600 of FIG. 6. System 800 can be implemented at least in part by system 700 of FIG. 7.

Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown). The memory can be a non-transitory computer-readable storage medium.

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage device 812 and fixed mass storage 820 generally store additional programming instructions, data, and the like that typically are not in active use by the processor 802. It will be appreciated that the information retained within mass storage device 812 and fixed mass storage 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The aforesaid integrated units can take the form of hardware, or they can take the form of hardware combined with software function units.

The units described above in which the software function units are integrated can be stored in a computer-readable storage medium. The software function units described above are stored in a storage medium and include a number of commands whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

All of the following exemplary embodiments may be obtained on the basis of the content disclosed by the present invention.

In some embodiments, while a user is using a device to browse an information list, it is determined whether a slide instruction has been received; if yes, then the information list is slid and the key words in the information appearing on the screen are subjected to intensified display.

In some embodiments, while intensifying display of key words in the information appearing on the screen, non-key words in the information appearing on the screen are subjected to a weakening display.

In some embodiments, for each piece of information, key words in the information are individually pre-extracted, and the extraction results are stored; subjecting key words in the information appearing on the screen to intensified display comprises: for each piece of information, subjecting the key words to intensified display when any recorded key word in the information appears on the screen.

In some embodiments, the extracting of key words in the information comprises: using one or a combination of the methods below to extract key words from the information: manual extraction and automatic extraction using a preset extraction algorithm.

In some embodiments, the storing of the extraction results comprises: recording the extracted key words, or recording the positions of the extracted key words in the information at which the key words are located.

In some embodiments, the intensifying the display of the key words as described comprises: transitioning the key words to an intensified display mode through transition animation; and weakening display of the non-key words comprises: transitioning the non-key words to a weakened display mode through transition animation.

In some embodiments, when the sliding stops, the key words in the information appearing on the screen are restored to the display mode that preceded intensified display and the non-key words in the information appearing on the screen are restored to the display mode that preceded weakened display.

In some embodiments, the restoring the key words to the display mode preceding intensified display comprises: transitioning the key words to the display mode that preceded the intensified display mode based on a transition animation; and restoring the non-key words to the display mode that preceded weakened display comprises: transitioning the non-key words to the display mode that preceded the weakened display mode based on a transition animation.

In some embodiments, the intensifying display of key words comprises: increasing the size and bolding of the font of the key words; and weakening the display of non-key words comprises: subjecting the non-key words to graying and semi-transparency treatment.

In some embodiments, the information comprises news; and the extracting key words from the information comprises: extracting key words from news headlines.

The preferred embodiments of the present invention that are described above are merely that and do not limit the present invention. Any modification, equivalent substitution, or improvement that is made in keeping with the spirit and principles of the present invention shall be included within the protective scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   extracting, from an information list, information pertaining to one or more keywords comprised in the information list, the information pertaining to the one or more keywords being stored in a mapping of the one or more keywords to corresponding information;
   determining that the information list is being browsed, wherein:
   the information list comprises a plurality of items; and
   an item in the plurality of items comprises the one or more keywords and one or more non-keywords;
   receiving a slide instruction; and
   in response to receiving the slide instruction,
      obtaining, from the mapping of the one or more keywords to corresponding information, the information pertaining to the one or more keywords and comprising a corresponding predefined location for the one or more keywords with respect to an item in the information list,
      performing a slide function on at least a portion of the information list, and
      performing one or more preset functions in relation to one or more words of the information list to display the one or more words of the information list differently from one or more other words in the information list, wherein:
         the one or more preset functions being is a configuration of one or more display characteristics of information comprised in the information list;
         the configuration is performed based at least in part on the extracted information pertaining to the one or more keywords; and
         the one or more words of the information list with respect to which the one or more preset functions is performed is based at least in part on a determination that a location of at least one of the one or more keywords in the information list matches the corresponding predefined location for the at least one of the one or more keywords.

2. The method of claim 1, further comprising:
   determining whether the slide instruction is received while the information list is being browsed,
   wherein the slide function and the one or more preset functions are performed in response to determining that the slide instruction is received while the information list is being browsed.

3. The method of claim 1, wherein the one or more preset functions in relation to the one or more words of the information list causes the one or more words to be displayed more emphatically in relation to the other words in the information list.

4. The method of claim 1, wherein the one or more preset functions comprises intensifying a display of keywords in the information list that appear on a screen.

5. The method of claim 4, further comprising:
while intensifying the display of keywords in the information list that appear on the screen, weakening a display of non-keywords in the information list that appear on the screen.

6. The method of claim 1, wherein:
the extracting the information pertaining to the one or more keywords comprises:
for each item in the information list, pre-extracting the one or more keywords from the corresponding item and storing the extraction results in the mapping of the one or more keywords to corresponding information; and
further in response to receiving the slide instruction, determining whether at least one of the keywords of the information list appears on a screen; and
in response to the determination that at least one of the keywords of the information list appears on the screen, displaying the at least one of the keywords of the information list based at least in part on the one or more preset functions, wherein the displaying of the at least one of the keywords is intensified.

7. The method of claim 1, wherein:
the one or more keywords are extracted based on one or more of a manual extraction and an automatic extraction using a preset extraction algorithm.

8. The method of claim 1, wherein:
the one or more words are extracted based on one or more of a manual extraction and an automatic extraction using a preset extraction algorithm, wherein the one or more words correspond to keywords; and
storing at least one of the extracted keywords or a respective position of the extracted keywords at which the keywords are located in the information list.

9. The method of claim 1, wherein:
performing the one or more preset functions in relation to the one or more words of the information list comprises intensifying a display of keywords and weakening a display of non-keywords;
the intensifying the display of keywords comprises: transitioning the keywords to an intensified mode of display based on transition animation; and
weakening the display of non-keywords comprises: transitioning the non-keywords to a weakened mode of display based on transition animation.

10. The method of claim 1, further comprising:
determining that the slide instruction has stopped; and
in response to determining that the slide instruction has stopped, restoring the one or more words to a manner in which the one or more words were displayed before performing the one or more preset functions.

11. The method of claim 10, wherein the restoring the one or more words to the manner in which the one or more words were displayed before performing the one or more preset functions comprises: restoring keywords in the information list that appear on a screen to a display mode that preceded an intensified display and restoring non-keywords in the information list that appear on the screen to a display mode that preceded a weakened display.

12. The method of claim 11, wherein:
restoring the keywords to the display mode that preceded the intensified display comprises: transitioning the keywords to the mode of display that preceded intensified display based on a transition animation; and
restoring the non-keywords to the display mode that preceded the weakened display comprises: transitioning the non-keywords to the mode of display that preceded weakened display based on a transition animation.

13. The method of claim 1, wherein:
the one or more preset functions comprise intensifying a display of keywords in the information list that appear on a screen, and weakening a display of non-keywords in the information list that appear on the screen;
the intensifying display of the keywords comprises: one or more of increasing a size and bolding a font of the keywords; and
the weakening display of the non-keywords comprises: subjecting the non-keywords to one or more of graying and semi-transparency treatment.

14. The method of claim 1, wherein:
information in the information list comprises: news; and
the one or more words are extracted from news headlines.

15. The method of claim 1, wherein the one or more words of the information list and the one or more other words in the information list are displayed in a same manner before the one or more preset functions are performed in relation to the one or more words in the information list.

16. The method of claim 1, wherein after the one or more preset functions are performed in relation to the one or more words, the one or more words are displayed in a manner that is different from a manner in which the one or more words were displayed before the one or more preset functions were performed in relation to the one or more words.

17. The method of claim 1, wherein the extracting the information pertaining to one or more keywords is performed before the receiving the slide instruction, and the configuration performed based at least in part on the extracted information pertaining to the one or more keywords is further based at least in part on a determination of whether the corresponding one or more keywords are displayed on the screen after the slide function is performed.

18. The method of claim 1, wherein:
the extracting the information pertaining to one or more keywords comprised in the information list according to a manual extraction mode or an automatic extraction mode, and
a determination of whether to extract the information according to the a manual extraction mode or the automatic extraction mode is based at least in part on a context of a terminal on which the information list is displayed, or one or more characteristics of the information comprised the information list.

19. The method of claim 1, wherein the one or more preset function are performed while the slide instruction is input and stopped in connection with the slide instruction being stopped.

20. The method of claim 1, wherein the receiving the slide instruction comprises:
obtaining an input to a touchscreen of a terminal;
determining whether the input is an input to an element of the information list or a slide input in connection with a browsing of the information list; and
in response to a determination that the input is a slide input in connection with the browsing of the information list, receiving the slide instruction.

21. A device, comprising:
one or more processors configured to:
extract, from an information list, information pertaining to one or more keywords comprised in the information list, the information pertaining to the one or more keywords being stored in a mapping of the one or more keywords to corresponding information;
determine that the information list is being browsed, wherein:
the information list comprises a plurality of items; and
an item in the plurality of items comprises the one or more keywords and one or more non-keywords;
receive a slide instruction; and
in response to receiving the slide instruction,
obtain, from the mapping of the one or more keywords to corresponding information, the information pertaining to the one or more keywords and comprising a corresponding predefined location for the one or more keywords with respect to an item in the information list,
perform a slide function on at least a portion of the information list, and
perform one or more preset functions in relation to one or more words of the information list to display the one or more words of the information list differently from one or more other words in the information list, wherein:
the one or more preset functions is a configuration of one or more display characteristics of information comprised in the information list;
the configuration is performed based at least in part on the extracted information pertaining to the one or more keywords; and
the one or more words of the information list with respect to which the one or more preset functions is performed is based at least in part on a determination that a location of at least one of the one or more keywords in the information list matches the corresponding predefined location for the at least one of the one or more keywords; and
one or more memories coupled to the one or more processors, configured to provide the one or more processors with instructions.

22. The device of claim 21, wherein the one or more processors are further configured to:
determine whether the slide instruction is received while the information list is being browsed,
wherein the slide function and the one or more preset functions are performed in response to determining that the slide instruction is received while the information list is being browsed.

23. The device of claim 21, wherein the one or more preset functions in relation to the one or more words of the information list causes the one or more words to be displayed more emphatically in relation to the other words in the information list.

24. The device of claim 21, wherein the one or more preset functions comprises intensifying a display of keywords in the information list that appear on a screen of the device.

25. The device of claim 24, wherein the one or more processors are further configured to:
while intensifying the display of keywords in the information list that appear on the screen, weaken a display of non-keywords in the information list that appear on the screen.

26. A computer program product, the computer program product being embodied in a non-transitory computer readable storage medium and comprising computer instructions for:
extracting, from an information list, information pertaining to one or more keywords comprised in the information list, the information pertaining to the one or more keywords being stored in a mapping of the one or more keywords to corresponding information;
determining that the information list is being browsed, wherein:
the information list comprises a plurality of items; and
an item in the plurality of items comprises the one or more keywords and one or more non-keywords;
receiving a slide instruction; and
in response to receiving the slide instruction,
obtaining, from the mapping of the one or more keywords to corresponding information, the information pertaining to the one or more keywords and comprising a corresponding predefined location for the one or more keywords with respect to an item in the information list,
performing a slide function on at least a portion of the information list, and
performing one or more preset functions in relation to one or more words of the information list to display the one or more words of the information list differently from one or more other words in the information list, wherein:
the one or more preset functions is a configuration of one or more display characteristics of information comprised in the information list;
the configuration being performed is at least in part on the extracted information pertaining to the one or more keywords; and
the one or more words of the information list with respect to which the one or more preset functions is performed is based at least in part on a determination that a location of at least one of the one or more keywords in the information list matches the corresponding predefined location for the at least one of the one or more keywords.

* * * * *

UNITED STATES PATENT AND TRADEMARK OFFICE
CERTIFICATE OF CORRECTION

PATENT NO. : 10,885,265 B2
APPLICATION NO. : 15/816869
DATED : January 5, 2021
INVENTOR(S) : Haixin Wang et al.

Page 1 of 1

It is certified that error appears in the above-identified patent and that said Letters Patent is hereby corrected as shown below:

In the Claims

In Column 18, Line(s) 48, Claim 1, after "functions", delete "being".

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*